United States Patent [19]
Xavier

[11] Patent Number: 6,099,573
[45] Date of Patent: Aug. 8, 2000

[54] METHOD AND APPARATUS FOR MODELING INTERACTIONS

[75] Inventor: Patrick G. Xavier, Albuquerque, N. Mex.

[73] Assignee: Sandia Corporation, Albuquerque, N. Mex.

[21] Appl. No.: 09/061,973

[22] Filed: Apr. 17, 1998

[51] Int. Cl.[7] .................................................. G06G 7/48
[52] U.S. Cl. .................... 703/7; 703/2; 703/6; 703/8; 701/301; 345/419; 345/441; 345/473
[58] Field of Search ................ 395/500.23, 500.27, 395/500.28; 345/419, 441, 473; 700/61, 103; 701/301; 703/2, 6, 7

[56] References Cited

U.S. PATENT DOCUMENTS

| | | | |
|---|---|---|---|
| 4,890,242 | 12/1989 | Sinha et al. | 345/419 |
| 4,944,034 | 7/1990 | Ohsawa | 345/419 |
| 5,014,230 | 5/1991 | Sinha et al. | 345/500.23 |
| 5,047,916 | 9/1991 | Kondo | 700/61 |
| 5,056,031 | 10/1991 | Nakano et al. | 701/301 |
| 5,056,045 | 10/1991 | Ohsawa | 345/441 |
| 5,307,282 | 4/1994 | Conradson et al. | 700/103 |
| 5,347,459 | 9/1994 | Greenspan et al. | 700/255 |
| 5,515,489 | 5/1996 | Yaeger | 345/473 |
| 5,572,634 | 11/1996 | Duluk, Jr. | 345/419 |
| 5,625,575 | 4/1997 | Goyal et al. | 395/500.27 |
| 5,808,625 | 9/1998 | Picott et al. | 345/440 |
| 5,929,864 | 7/1999 | Picott et al. | 345/440 |

OTHER PUBLICATIONS

Xavier, "Fast Swept–Volume Distance for Robust Collision", 1997 IEEE International Conference on Robotics and Automation, pp. 1162–1169, Apr. 1997.

Stephen Cameron, *Dealing With Geometric Complexity In Motion Planning*, IEEE ICRA 1996 Workshop on Practical Motion Planning in Robotics, Minneapolis, MN, 1996.

Henry Fuchs, University of North Carolina at Chapel Hill; Zvi M. Kedem and Bruce F. Naylor, The University of Texas at Dallas, *On Visible Surface Generation by a Priori Tree Structures*, 1980 ACM 0–89791–021–4/80/0700–0124.

Chris L. Jackins and Steven L. Tanimoto, *Oct–Trees and Their Use in Representing Three–Dimensional Objects*, Computer Graphics and Image Processing, 14, 249–270 (1980).

Donald Meagher, *Geometric Modeling Using Octree Encoding*, Computer Graphics and Image Processing, 19, 129–147 (1982).

Bernard Faverjon, *Hierarchical Object Models for Efficient Anti–Collision Algorithms*, CH2750–8/89/0000 1989 IEEE.

(List continued on next page.)

*Primary Examiner*—Kevin J. Teska
*Assistant Examiner*—Samuel Broda
*Attorney, Agent, or Firm*—V. Gerald Grafe

[57] ABSTRACT

A method and apparatus for modeling interactions between bodies. The method comprises representing two bodies undergoing translations and rotations by two hierarchical swept volume representations. Interactions such as nearest approach and collision can be modeled based on the swept body representations. The present invention can serve as a practical tool in motion planning, CAD systems, simulation systems, safety analysis, and applications that require modeling time-based interactions. A body can be represented in the present invention by a union of convex polygons and convex polyhedra. As used generally herein, polyhedron includes polygon, and polyhedra includes polygons. The body undergoing translation can be represented by a swept body representation, where the swept body representation comprises a hierarchical bounding volume representation whose leaves each contain a representation of the region swept by a section of the body during the translation, and where the union of the regions is a superset of the region swept by the surface of the body during translation. Interactions between two bodies thus represented can be modeled by modeling interactions between the convex hulls of the finite sets of discrete points in the swept body representations.

22 Claims, 5 Drawing Sheets

OTHER PUBLICATIONS

Sean Quinlan, *Efficient Distance Computation Between Non–Convex Objects*, 1050–4729/94 1994 IEEE.

Yuichi Sato, Mitsunori Hirata, Tsugito Maruyama, Yuichi Arita, *Efficient Collission Detection Using Fast Distance–Calculation Algorithms for Convex and Non–Convex Objects*, Proceedings of the 1996 IEEE International conference on Robotics and Automation, Minneapolis, Minnesota—Apr. 1996.

S. Gottschalk, M. C. Lin, D. Manocha, *OBBTree: A Hierarchical Structure for Rapid Interference Detection*, Computer Graphics Proceedings, Annual Conference Series, 1996.

John Canny, *Collision Detection for Moving Polyhedra*, IEEE Transactions on Pattern Analysis and Machine Intelligence, vol. PAMI–8, No. 2, Mar. 1986.

Stephen Cameron, *Collision Detection by Four–Dimensional Intersection Testing*, IEEE Transaction on Robotics and Automation, vol. 6, No. 3, Jun. 1990.

Stephen Cameron, *A Comparison of Two Fast Algorithms for Computing the Distance Between Convex Polyhedra*, Submitted to IEEE TR&A as a Communications Paper, Jul. 1996.

Elmer G. Gilbert, Daniel W. Johnson and S. Sathiya Keerthi, *A Fast Procedure for Computing the Distance Between Complex Objects in Three–Dimensional Space*, IEEE Journal of Robotics and Automation, vol. 4, No. 2, Apr. 1988.

Patrick G. Xavier, *A Generic Algorithm for Constructing Hierarchical Representations of Geometric Objects*, 1996 IEEE International Conference on Robotics and Automation.

METHOD AND APPARATUS FOR MODELING INTERACTIONS

METHOD AND APPARATUS FOR MODELING INTERACTIONS

This invention was made with Government support under Contract DE-AC04-94AL85000 awarded by the U.S. Department of Energy. The Government has certain rights in the invention.

BACKGROUND OF THE INVENTION

This invention relates to the field of modeling interactions, specifically modeling interactions among complex polyhedra in motion.

Many robotics applications require modeling of interactions. For example, collision detection is a basic problem in robotics and related areas, arising in motion planning, control, graphical programming, motion-preview, virtual reality, and dynamical simulation. The collision detection problem asks whether a rigid body moving along a given path intersects with any of a set of obstacles at any point on that path. In a fuller version of the problem, all contacts must also be determined. In both cases, accuracy is of extreme importance when the results of collision detection between modeled objects affect the behavior of physical robots or influence the outcomes of physical simulations, such as those used in process and product design and evaluation.

Most current methods for collision detection rely on interference detection or distance computation. A few recent algorithms are very fast, using queries at steps in the bodies' motion. However, the difficulty of determining collisions or distances between steps mandates the use of very small step sizes, consequently reducing efficiency.

Interference detection (or collision detection) for a rigid body R at a position and orientation x and obstacles O means to determine whether $R(x) \cap O$ is non-empty, with $R(x)$ denoting the image of R in the world. Distance computation means to determine the minimum distance between all points in $R(x)$ and those in O. Simple collision detection for a rigid body R moving over a path segment among obstacles O means to determine whether at any point along the path the body contacts or intersects any obstacles. In other words, if we let C denote the space of positions and orientations and let p: $[0,1] \to C$ denote the path segment, then collision detection asks whether there is any $t \in [0,1]$ such that $R(p(t)) \cap O$ is non-empty.

Exact or accurate collision detection is often avoided for the sake of speed. Usually, either interference detection or distance computation queries are applied at closely spaced points on the path. Simple use of interference detection can miss collisions. Growing the objects by a safety margin can prevent this, but at the risk of detecting false collisions. With distance computation, one can vary the step size to reduce the number of queries needed to obtain a given resolution, but resolution is limited by the minimum step size.

For a number of years, hierarchical geometric representations have been used to avoid "all pairs" comparisons in interference detection, distance computation, and collision detection. The binary-space partitioning tree (BSPtree) and variants have been successfully used in exact interference checking and contact determination, but they do not readily yield distance information. See, e.g., Fuchs et al., "On visible surface generation by a priori tree structures," Proc. of ACM SIGGRAPH, pages 124–133,1980. The octree is another space-partitioning data-structure that has been used in interference detection, but it must be used with other geometric objects to obtain computations matching the accuracy of faceted boundary representations or BSP-trees. See, e.g., Jackins et al., "Octrees and their use in representing three-dimensional objects," Computer Graphics and Image Processing, (14):249–270, 1980; Meagher, "Geometric modeling using octree encoding," Computer Graphics and Image Processing, (19): 129–147, 1982.

Other hierarchical structures use various primitives to bound an object or its surface at each level of the hierarchy, although sometimes holes are treated explicitly. See, e.g., Faverjon, "Hierarchical object models for efficient anti-collision algorithms," Proc. IEEE ICRA 1989, pages 333–340, Scottsdale, Ariz., 1989. Successful implementations for exact interference detection and distance computation have been based on several geometric primitives. Convex-hull based implementations, sphere-based techniques, and bounding-prism methods are among those known to be fast. See, e.g., Cameron, "Dealing with geometric complexity in motion planning," IEEE ICRA 1996 Workshop on Practical Motion Planning in Robotics," Minneapolis, Min., 1996; Quinlan, "Efficient distance computation between non-convex objects," Proc. 1994 IEEE Int'l Conf on Robotics and Automation, San Diego, Calif., 1994; Sato et al., "Efficient collision detection using fast distance calculation algorithms for convex and non-convex objects," Proc. 1995 IEEE Int'l Conf on Robodcs and Automation, pages 772–778, Minneapolis, Min., April 1996; Gottschalk et al., "OBB-tree: A hierarchical structure for rapid interference detection," Proc ACM SIGGRAPH'90, 1996. However, none of these results cover swept-body distance or swept-body interference detection.

Canny described a technique for exact collision detection for convex polyhedra moving along path segments linear in translation and the quaternion representation of SO(3). See Canny, "Collision detection for moving polyhedra," IEEE Trans. on Pattern Analysis and Machine Intelligence, 8(2) :200–209, 1986. Finally, Cameron used space-time techniques and develops algorithms and hierarchical structures for exact collision detection for non-convex objects. See Cameron, "Collision detection by 4D intersection testing," Int'l Journal of Robotics Research, 6(3):291–302, June 1990. Both these results are general in allowing exact time intervals of contact and penetration to be computed directly. Canny, however, only computes interactions between convex objects. Cameron describes a theoretical method for objects modeled by Boolean constructive solid geometry (CSG) trees and an implemented method of objects modeled by Boolean CSG trees with linear half-spaces at their leaves. The implemented method of Cameron is complicated and might be computationally expensive for a large class of non-convex objects, particularly those whose CSG models include difference operator. Neither Canny nor Cameron provides computation of the minimal clearance distance between bodies that do not collide.

Current technology thus provides two options, even when the motions are linear translations: (i) distance computation or interference detection between moving objects at discrete points in time; and (ii) exact collision detection in space-time without clearance distances that has limitations with regard to non-convex objects. The first option often requires very small motion steps for robustness (e.g., to not miss collisions), which causes a performance penalty in simulations, motion planning, graphical programming, and motion inspection. It is not an option when the motion step-size cannot be arbitrarily controlled, which is the case with currently available virtual reality motion-capture systems. Because many objects in the world are non-convex, the second option is of limited use in the applications mentioned above. Furthermore, the lack of robust minimal clearance distance computation during motion limits what is feasible in safety analyses.

There is therefore a need for a method and apparatus for modeling interactions between moving bodies that is faster and more robust than current approaches.

SUMMARY OF THE INVENTION

The present invention provides a method and apparatus for modeling interactions that overcomes drawbacks of the prior approaches. The method of the present invention comprises representing two bodies undergoing translations and rotations by two hierarchical swept volume representations. Interactions such as nearest approach and collision can be modeled based on the swept body representations. The present invention is computationally fast and robust, and relatively simple to implement. It can serve as a practical tool in motion planning, CAD systems, simulation systems, safety analysis, and applications that require modeling time-based interactions.

A body can be represented in the present invention by a union of convex polygons and convex polyhedra. As used generally herein, polyhedron includes polygon, and polyhedra includes polygons. The body undergoing translation can then be represented by a swept body representation, where the swept body representation comprises a hierarchical bounding volume representation whose leaves each contain a representation of the region swept by a section of the body during the translation, and where the union of the regions is a superset of the region swept by the surface of the body during translation. Interactions between two bodies thus represented can be modeled by modeling interactions between the convex hulls of the finite sets of discrete points in the swept body representations.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

The present invention provides a method for computing the minimum distance between the regions swept by two moving bodies that each experience an independent linear translation and can also experience a rotation. If the two swept regions interfere (i.e., the minimum distance is zero), the invention provides a method for detecting which pairs of primitives used in modeling the bodies give rise to this interference.

Figure 1:
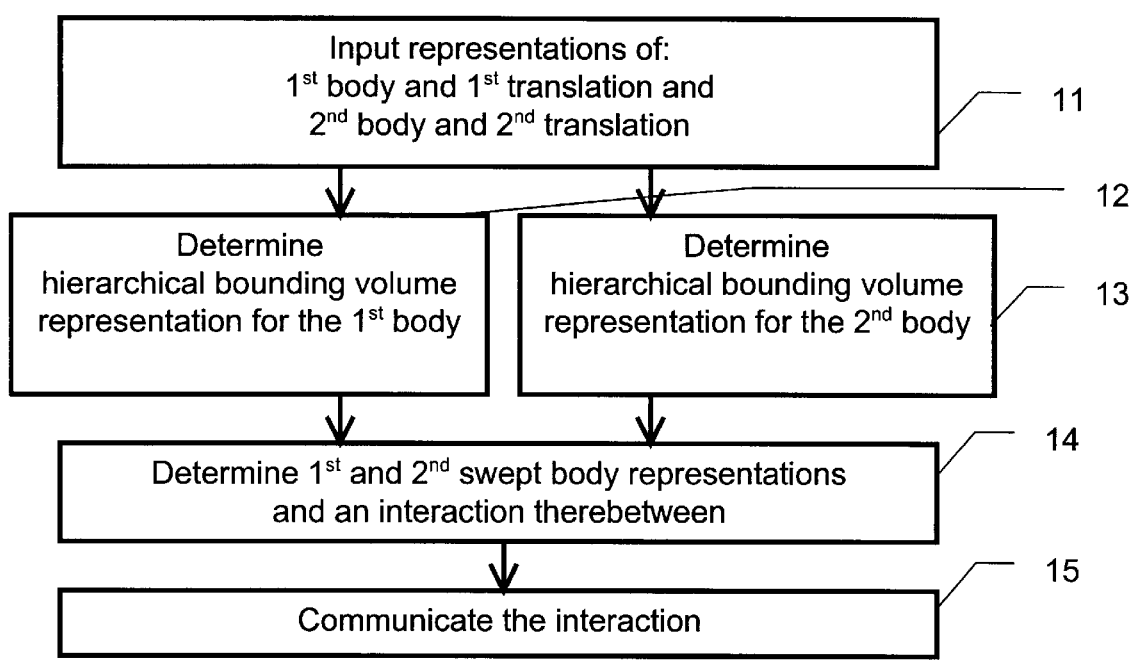
FIG. 1 is a flow diagram of a method according to the present invention.

FIG. 1 is a flow diagram of a method according to the present invention. The method begins with input of representations of first and second bodies and corresponding translations 11. The representations can be from computer-aided design (CAD) information, measured parameters from physical devices or models, or computer-predicted data, for example. Either or both translations can be null, i.e., the method models interactions between two bodies with either, both, or neither undergoing non-null translation. The method is extended by an approximation for rotational sweeps, described after the basic translational sweep method description. Either or both rotations can be null, i.e., the method models interactions between bodies with either, both, or neither undergoing non-null rotation.

Next, the input representations are transformed into hierarchical bounding volume representations 12, 13. One method suitable for producing hierarchical bounding volume representations is described by Xavier in "A Generic Algorithm for Constructing Hierarchical Representations of Geometric Objects," 1996 IEEE International Conference of Robotics and Automation, incorporated herein by reference. The hierarchy produced by the method of Xavier is a binary tree whose nodes each contain a convex polygon or convex polyhedron. The subtree rooted at a node represents the union of the primitives at its leaves. Thus, each node of Xavier's hierarchical geometric representation contains a conservative approximation, or wrapper, of the object represented by its subtree. One simple variation is to limit the number of vertices on each polyhedron or polygon at interior nodes of the bounding volume hierarchies, for example by replacing polyhedra and polygons in violation of the policy with minimal bounding prisms.

Those skilled in the art will appreciate that the bounding volume hierarchy for a given body need not be recomputed every time the body is used as input for the method of the present invention. Data structures can allow each body to be mapped to a different position and location in space for its starting points, simply by applying the respective mapping to the vertices in the respective bounding volume hierarchy.

Each node of the swept volume bounding volume hierarchy need only be computed as it is needed. The hierarchical swept volume representation is partially implicit in that at each node an actual bounding volume is not computed, but rather a set of vertices whose convex hull is the bounding volume is computed. At each node of the bounding volume representation we apply the motion transformation to the vertices (of the polygon or polyhedron) at the node and add the resulting vertices to those at the node; the convex hull of the combined set of vertices is the region swept out by the node, but we never have to compute this convex hull.

Interactions between the two bodies undergoing translations can then be determined from the swept body representations 14. For example, collisions can be determined. As another example, the distances between the bodies during translation can be modeled. The steps involved in determining certain of these interactions are presented in more detail below.

The interaction can then be communicated 15. For example, the interaction can be communicated directly to a user. As another example, the interaction can be communicated to a software tool for display or design feedback.

Those skilled in the art will appreciate other communication modes and functions.

DISTANCE DETERMINATION

A recursive method as in Table 1 can perform basic distance computation between two modeled bodies (without sweeps). At each stage the method considers a pair of nodes, one from each tree, beginning at the roots, with the distance dist set at infinity. In the base case, the method simply determines the distance between two convex primitives, and sets dist to this distance if it is smaller than the current value. In the recursive case, if the distance between the hulls of the current nodes is no greater than dist, then the method recurses using the current node from one tree paired with each of the children of the current node from the other; otherwise, it cuts the current branch of the recursion. The len (b1)<len (b2) test is a heuristic, comparing principal axis lengths to decide which one of b1 and b2 should be descended in the recursive steps.

TABLE 1

```
real cstkDist(body *R, body *S)
{       real dist = ∞;
        pairStack stack;
        body *b1, *b2;
        stack.push(R,S);
        while (!stack.isEmpty()) {
            stack.pop(&b1,&b2);
            if (isLeaf(b1) ∧ isLeaf(b2))
                dist ← min(dist,primDist(b1,b2));
            else if (hullDist(b1,b2)>dist)
                continue;
            else if (isLeaf(b1) v (!isLeaf(b2) v len(b1) <len(b2))) {
                stack.push(b1,b2→child1);
                stack.push(b1,b2→child2);
            }
            else {
                stack.push(b1→child1,b2);
                stack.push(b1→child2,b2);
            }
        }
        return dist;
}
```

Both hullDist (. .) and primDist (. .) determine the distance between two convex polyhedra (including convex polygons). This can be efficiently done according to the method known as Gilbert's Algorithm, described by Gilbert et al. in "A fast procedure for computing the distance between complex objects in three-dimensional space," IEEE Journal of Robotics and Automation, 4(2), April 1988, incorporated herein by reference.

To extend the method to the case of a translationally-swept bodies, note that Gilbert's Algorithm, given two finite sets of points, determines a minimum distance vector between their convex hulls. Observe that the convex hull of the vertices of a polyhedron (polygon) and their images under a translation x is equal to the swept hull of that polyhedron (polygon) under translation x. Thus, the method of the present invention can use Gilbert's Algorithm to determine the distance between the volumes swept by two polygons or polyhedra under linear translations. It does this by adding the new positions of the vertices to the lists of input vertices. Finally, if A, B, and C are convex and A∪B⊂C, then sweep(A,x)∪sweep(B,x) ⊂ sweep(C,x), so the conservative approximation nature of the hierarchies is preserved under translational sweeps.

Accordingly, the method of the present invention modifies the method of Table 1 by first adding vectors x and y, which gives the translations to be applied to R and S, to the input parameter list. It then replaces the function calls primDist (b1, b2) and hullDist (b1,b2) with the call transGilbert(b1,x, b2, y), which calls Gilbert's Algorithm on the vertices of b1 unioned with their images under translation x, and on the vertices of b2 unioned with their images under translation y. The resulting method determines the exact distance between the volumes swept by b1 and b2 under translations x and y respectively.

As a further description of distance detection according to the present invention, consider the pseudocode shown in Table 2. This pseudocode takes two sets of vertices as input and computes the distance between the convex hulls of two sets of vertices, which is the main work of

TABLE 2 primDist (. . .), hullDist (. . .), and transGilbert (. . .).
```
real gilDist(vertex_set verts_1, vertex_set verts_2)
{       real dist = ∞;
        simplex md_simplex = initial_Mink_diff_simplex(verts1, verts2);
        vector3D<real> dist_vector;
        repeat {
            if (simplex_spatially_contains(md_simplex, Origin))
                return(0);
            dist_vector = simplex_distance_vector(md_simplex, Origin);
            dist = length(dist_vector);
            if (verify_minimal(dist, dist_vector, verts_1, verts_2))
                return(dist);
            update_Mink_diff_simplex(dist_vector, &md_simplex,
                                    verts_1, verts_2);
        }
}
```

The Table 2 pseudocode function gilDist (. .) makes use of a simplex (md_simplex) from the Minkowski difference of the input sets of vertices $verts_{13}$ 1 and $verts_{13}$ 2. Here, a simplex is the convex hull of a single vertex, two distinct vertices, three non-co-linear vertices, or four non-co-planar vertices. This description assumes that a simplex is represented by its vertices. The Minkowski difference of two sets of points V and W, denoted "MinkowskiDiff(V, W)," is the set of all points p such that there exists some point v in V and some point w in W such that p=v−w. The distance between two convex hulls is equal to the distance from their Minkowski difference to the origin, and similarly, a vector is the minimal distance vector between two convex hulls if and only if it is the minimal distance vector between their Minkowski difference and the origin.

Once initialized, the simplex $md_{13}$ simplex always consists of vertices from MinkowskiDiff(verts_1, verts2). The following steps are then repeated until an answer is returned. If the current $md_{13}$ simplex overlaps the origin as determined by $simplex_{13}$ $spatially_{13}$ contains (. .), then a distance of zero is returned. Otherwise, the $simplex_{13}$ $distance_{13}$ vector (. .) computes the minimal-distance vector from $md_{13}$ simplex to the origin, and a function $verify_{13}$ minimal (. .) determines whether this vector is also a minimal distance vector between the convex hulls of the two input sets of vertices. If it is, then its length is returned as the distance between the convex hulls. Otherwise, $md_{13}$ simplex is updated to a new simplex, i.e., one that the function has not considered in the current call to it, whose vertices are in MinkowskiDiff($verfs_{13}$ 1, verts2). Gilbert gives one way of implementing $simplex_{13}$ $distance_{13}$ vector (. .) as the "distance sub-algorithm". Those skilled in the art will appreciate other algebraically equivalent embodiments of the present invention.

If the step of modifying the simplex $md_{13}$ simplex in the method of Table 3 results in a simplex that is closer to the origin, then the method of Table 2 becomes a hillclimbing method, which is more efficient than exhaustive search. A step for modifying md_simplex that follows the method of Gilbert and meets this condition can be implemented as shown in the pseudocode of Table 3. This step is particularly effective at causing fast convergence and is recommended for use in the present invention; this is why we call the pseudocode function in Table 3 distGil(. .).

TABLE 3

```
update_Mink_diff_simplex(vector3D<real> dist_vector,
                         simplex *md_simplex,
                         vertex_set verts_1, vertex_set verts_2);
{    vertex vrtx1, vrtx2, splx_vrtx;
     vrtx1 = max_support(dist_vector, verts_1);
     vrtx2 = min_support(dist_vector, verts_2);
     splx_vrtx = vrtx2 - vrtx1;
     remove_extraneous(dist_vector, md_simplex);
     add_vertex(md_simplex, splx_vrtx);
}
```

The pseudocode in Table 3 assumes as inputs a vector $dist_{13}$ vector, a simplex $md_{13}$ simplex, and two sets of vertices $verts_{13}$ 1 and $verts_{13}$ 2. $max_{13}$ support (..) takes a vector and a set of vertices as input and returns a vertex from this set furthest in the direction of the vector. $min_{13}$ support (. .) takes a vector and a set of vertices as input and returns a vertex from this set furthest in the direction opposite the vector. $remove_{13}$ extraneous (. .) takes a vector and a simplex and removes from the simplex those vertices that are not (tied for) furthest in the direction of the vector; if $update_{13}$ $Mink_{13}$ $diff_{13}$ simplex (. .) is "called" as shown in the pseudocode for gilDist (. .), then the only vertices remaining lie in the plane that contains the point on the simplex that is closest to the origin and that is perpendicular to the vector from this point to the origin. $add_{13}$ vertex (. .) simply adds a vertex to a simplex.

Those skilled in the art will appreciate various methods for computing $min_{13}$ support (. .) and $max_{13}$ support (. .) that exploit different data structures for the input vertex set. Going through the input vertex set serially is sufficient, but performance can be improved when all the vertices in the input vertex set lie on the convex hull of the set, by storing edge-adjacency (on the convex hull) information applying and hillclimbing instead of a linear search. This latter method is asymptotically faster, taking roughly $O(\sqrt{n})$ time instead of $O(n)$ time, but has a larger asymptotic constant and requires a larger data structure. See e.g., Cameron, "Comparison of Two Fast Algorithms for Computing the Distance between Convex Polyhedra", published on the World Wide Web, September 1996. Because the planes passing through the origin and perpendicular to the edges of a vertex on a convex polyhedron determine the pre-image polytope of that vertex under max_support (. .) or min_support (. .), it is possible to apply well-known computational geometric methods to yield $O(\lg(n))$ implementations. This method, too has a larger asymptotic constant than the simple method and requires a more complex data structure. These methods can be extended to include the case in which the set of input vertices is the union of vertices of a number of known convex polyhedra (including polygons), most simply by computing the function for each of the convex polyhedra and then applying the serial version of the function to the resulting set of outputs.

The test performed by $verify_{13}$ minimal (. .) merits additional description. There are two basic tests using an error bound eps based on the minimum accuracy in the machine representation of the vertices in the two bodies and applying standard numerical analysis techniques. First, if dist would be smaller than this bound eps, then $verify_{13}$ minimal (. .) rounds dist to 0 and returns true. Second, vrtx1 and vrtx2 are computed as in Table 3, and from these two vertices and $dist_{13}$ vector we compute an error measure: $<dist_{13}$ vector,$dist_{13}$ vector>+$<dist_{13}$ vector,vrtx1>−$<dist_{13}$ vector,vrtx2>. If this error measure is sufficiently small, then $verify_{13}$ minimal (. .) returns true. Different assumptions yield different smallness criteria. In one simple criterion, this error measure is compared to the product of eps and dist. If the error measure is smaller, then $verify_{13}$ minimal (. .) returns true. Finally, if the value of dist is not smaller than its previous value, $verify_{13}$ minimal (. .) returns true, and dist and $dist_{13}$ vector can revert to their previous values.

As a further description of distance determination according to the present invention, consider the pseudocode shown in Table 4. Here, we generalize the pseudocode from Table 1 to cover the case when bodies R and S are placed in configurations $conf_{13}$ R and $conf_{13}$ S, respectively, and then subjected to translations x and y, respectively, where a configuration for a rigid body is a particular position and orientation. We also show what should be done so that distGil (. .) can be called directly, instead of using functions primDist (. .), hullDist (. .), and transGilbert (. .) as described above.

TALBE 4

```
distance(body *R, configuration conf_R, vector x,
         body *S, configuration conf_R, vector y)
{    real dist ← ∞;
     pairStack stack;
     body *b1, *b2;
     stack.push(R,S);
     while (!stack.isEmpty()) {
         stack.pop(&b1,&b2);
         verts1 = combine(b1->bounding_vertices(conf_R)),
                          transMap (b1->bounding_vertices (conf_R), x));
         verts2 = combine(b2->bounding_vertices(conf_S)),
                          transMap (b2->bounding_vertices (conf_S), y));
         if (isLeaf(b1) ∧ isLeaf(b2))
              dist ← min(dist, gilDist (verts1, verts2));
         else if (gilDist(verts1,verts2) > dist)
              continue;
         else if (isLeaf(b1) ∨ (!isLeaf(b2) ∨ len(b1) < len(b2)))
              foreach child in b2->children
                   stack.push(b1, child);
         else
              foreach child in b1->children
                   stack.push(child,b2);
     }
     return dist;
}
```

This pseudocode performs a tree traversal similar to that in Table 1. However, it assumes that the input bodies R and S are already bounding volume hierarchies, and that at each node of the hierarchy a set of bounding vertices whose convex hull bounds the union of the leaves of that node's subtree is available. This assumption is made because if the method will be used on a body more than once, with that body possibly at different configurations, it is disadvantageous to repeat construction of its bounding volume hierarchy over and over. This pseudocode does not assume that the hierarchy trees are binary, so the recursion must cover all the children of either the current b1 or the current b2.

If Bp is a pointer to body B (which could be a node in a greater body), and $conf_{13}$ B is a configuration, then Bp->$bounding_{13}$ vertices($conf_{13}$ B) returns a set of vertices whose convex hull bounds B. This can be implemented by simply mapping B's bounding vertices to where they would be when B is in configuration $conf_{13}$ B. The particular set may have special properties that max_support (. .) and min_support (. .) can take advantage of, as described above. transMap (. .) takes a vertex set and a translation and returns a copy of the set that has been moved by the translation. combine (. .) takes two vertex sets as arguments and combines them into a set that is the union of the two sets and whose particular data structure preserves whatever properties that min_support (. .) and $max_{13}$ support (. .) can take advantage of. For example, if the support function can be computed in sublinear time individually on the two sets because of their data structure, then the data structure output by combine should allow the support function to be executed individually on the two sets; the support function can then be run on the two outputs.

---

If x is a translation, then
    combine (Bp->bounding_vertices (conf_B)),
        transMap (Bp->bounding_vertices (conf_B), x)

--- is a set of bounding vertices for the region swept by B at starting at configuration $conf_{13}$ B and subjected to translation x. If B is a convex polygon or a convex polyhedron, then its vertices are its bounding vertices and the result of this combine is a set of vertices whose convex hull is exactly the swept region. Thus, since the distGil (. .) function computes the distance between the convex hulls of its input vertex sets, the method of Table 4 implicitly transforms the input bodies into hierarchical bounding representations of their swept regions according to the input configurations and input translations.

Several optimizations can improve the performance of an implementation of distance (. .). One optimization is to, for each pair of bodies used as arguments to distance (. .), cache the pair of leaf nodes that yields the minimal distance; on the next call to the function for this pair, with the bodies possibly at different configuration, compute the distance between these two nodes in their new configurations, and then use this distance instead of infinity as the initial value of dist. A second optimization is to keep a cut-table of pairs of interior nodes for which it is believed that a check against the current value of dist could cause a cut in the recursion, and to do the pre-recursion checks (gilDist (verts1, verts2) >dist) only on the nodes in this table. Two additional optimizations apply to this implementation of distGil (. .). First, add an optional $max_{13}$ dist argument, and cut short distGil ( . . )'s computation if the actual distance exceeds this distance. When, distance (. .) calls distGil (. .), the the current value of dist (in distance (. .)) is used for this argument. Second, distance (. .),distGil (. .), and $initial_{13}$ $Mink_{13}$ $diff_{13}$ simplex (. .) are modified so that the bounding vertices that give rise to the minimum-distance simplex found by distGil (. .) are cached by distance (. .) for each pair of bodies (b1, b2) popped off the recursion stack stack, implementing a suggestion in Gilbert. As a matter of practicality, the cache is limited in size so that pairs are bumped from it when it gets full.

COLLISION DETERMINATION

The present invention accomplishes collision detection through a modification to the method of distance determination. A straightforward way to accomplish collision detection between two swept bodies is to compute the distance between them. If the resulting distance is smaller than a user-specified non-negative collision distance ("safety margin"), then the two swept bodies are determined to be in collision. As an optimization, distance (. .) can be modified to take such a safety margin as an additional argument; it initializes dist to this value instead of infinity. Finally, if the two bodies are moving translationally at constant velocities, swept-body collision detection can be used to determine whether they collide via transformation into a frame in which one of the bodies is stationary.

As a further example, consider the pseudocode in Table 5. The function collision (. .) is similar to distance (. .). Instead of returning a distance, it returns a list of leaf node pairs whose swept regions are in collision, i.e, a witness list. The function takes two additional arguments: a collision distance ($collision_{13}$ dist) and the maximum length of witness list to return. In the base case, if b1 and b2 are primitives (leaf nodes), then we check whether the corresponding swept regions are at most $collision_{13}$ dist apart; if they are, we add them as a pair to the witness list. Also, $collision_{13}$ dist is used in the conditional instead of dist, as in the test for cutting recursion. Obviously, actually accumulating a list would be optional if we only wanted a count of how many witnesses there are. Those knowledgeable in the art will appreciate that applicable optimizations described for distance (. .) and its calling subtree will not affect the correctness of collision (. .).

TABLE 5

```
list<prim_pair>
collisions(body *R, configuration conf_R, vector x,
          body *S, configuration conf_R, vector y,
          real collision_dist, int max_witnesses)
{   list<prim_pair> collision_list(Empty);
    pairStack stack;
    body *b1, *b2;
    stack.push(R,S);
    while (!stack.isEmpty()) {
        stack.pop(&b1,&b2);
        verts1 = combine(b1->bounding_vertices(conf_R)),
              transMap (b1->bounding_vertices (conf_R), x);
        verts2 = combine(b2->bounding_vertices(conf_S)),
              transMap (b2->bounding_vertices(conf_S), y);
        if (isLeaf(b1) ∧ isLeaf(b2)) {
            if (gilDist(verts1, verts2) <= collision_dist) {
                collision_list.enqueue(b1, b2);
                if (collision_list.size() >= max_witnesses)
                    return collision_list;
            }}
        else if (gilDist(verts1,verts2) > collision_(dist)
            continue;
        else if (isLeaf(bl) v (!isLeaf(b2) v len(b1) < len(b2)))
            foreach child in b2->children
                stack.push(b1, child);
        else
            foreach child in b1->children
                stack.push(child,b2);
    }
    return collision_list;
}
```

ROTATIONAL SWEEP APPROXIMATION

For motions that include a small single-axis rotation, two variations of the above method are described. The first is a simple one that might underestimate or overestimate the distance. The second is a conservative one that will never overestimate it but might underestimate the distance. Both require the rotation angle to be less than $\pi/2$ radians. Both variations determine approximate collision, i.e., they determine collision subject to bounded error quantifiable as maximum penetration depth when the method incorrectly determines no collision and quantifiable as a maximum closest clearance when the method incorrectly determines collision. In the case of determining approximate collision between the regions swept by two bodies undergoing a motion, the bound on the error preferably is dependent upon the size of the motion, as well as upon the size of model parameters.

Figure 5A:
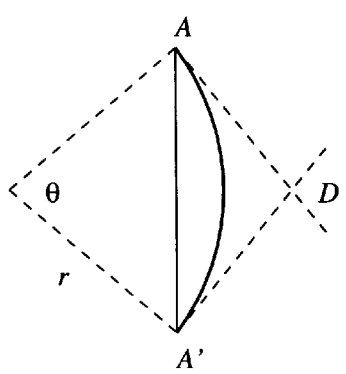
FIGS. 5(a,b) illustrate a body undergoing rotation.
Figure 5B:
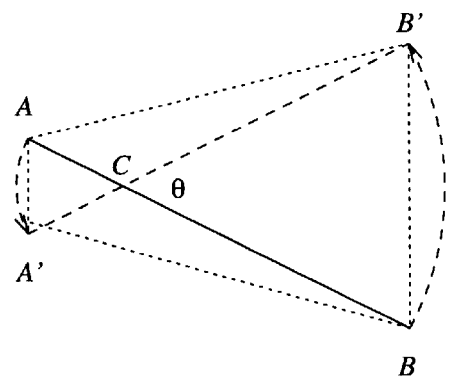

The simple approximation technique replaces the function calls to primDist (b1,b2) and hullDist (b1,b2) with calls to a function that calls Gilbert's Algorithm on the unions of the vertices of b1 and b2 and their final images under the sweep motions, just as in the translational case. By convexity, it suffices to consider the case of a line segment. First, consider a vertex rotated by angle θ about an axis a distance r away, as illustrated by FIG. 5a. In FIG. 5a line segment AA' approximates arc AA'. If segments AD and DA' are tangents, then triangle ADA' bounds the arc. Referring to FIG. 5b, line segment AB rotates by θ about C; a new term must bound the maximum distance between segment AB' (or A'B) and the union of sectors ACA' and BCB'. The distance between the arc the vertex follows and the line segment between its original and final locations is bounded as in equation 1.

$$r\left(1 - \cos\left(\frac{\theta}{2}\right)\right) \qquad \text{equation 1}$$

For a line segment that has projected length l perpendicular to the axis of rotation, we bound the maximum distance between the region swept by the segment and the (4-vertex) convex hull of its vertices at their original and final locations. This is equation 1 plus the greatest minimum distance possible between an axis of rotation on the segment and the boundary of the 4-vertex convex hull (see FIG. 5b), as in equation 2.

$$r\left(1 - \cos\left(\frac{\theta}{2}\right)\right) + \frac{l}{2}\sin\theta \qquad \text{equation 2}$$

Equation 2 thus bounds the error in distance computation that can result. Compared to the $$r\sin\left(\frac{\theta}{2}\right)$$

error bound resulting from just computing distance before and after the rotation, we see that the part of the error dependent on rotational radius r decreases quadratically with the rotation angle instead of linearly (consider the series expansions).

A more sophisticated technique is similarly bounded in error but conservative, returning distances no greater than the actual distance. In the planar case, the position of each vertex during motion is bounded by the triangle formed by its initial and final positions and the intersection of the tangents to the path at those positions, as shown in FIG. 5a. The distance from the two new edges to the arc is bounded by $$r\tan\left(\frac{\theta}{2}\right)\sin\left(\frac{\theta}{2}\right)$$

which is greater than equation 1. Substituting this into equation 2, we obtain an error bound for the line segment case, in equation 3.

$$r\tan\left(\frac{\theta}{2}\right)\sin\left(\frac{\theta}{2}\right) + \frac{l}{2}\sin\theta \qquad \text{equation 3}$$

Now, suppose that a vertex p is subjected to a simultaneous translation normal to the rotation axis, so that its position for s ∈ [0,1] is given by equation 4.

$$R_{n\theta}(s\theta)(p-r_0)+r_0+sx \qquad \text{equation 4}$$

where $R_{n\theta}(\alpha)$ is the rotation matrix for angle α about nθ and the original axis of rotation goes through $r_0$. Then the same construction bounds the motion of the vertex, and the error bound for a line segment remains that in equation 3.

The case with a translational component parallel to the rotation axis is similar, but requires a four-vertex hull instead of a triangle for each vertex. Again use the tangents to the vertex's path at the endpoints, but instead find their intersections with the plane bisecting the line segment between the initial and final vertex positions. The four-vertex hull then bounds the path. A simple but not tight error bound doubles equation 4, so that for a swept line segment of projected length l, the error bound is shown in equation 5.

$$2r\tan\left(\frac{\theta}{2}\right)\sin\left(\frac{\theta}{2}\right) + l\sin\theta \qquad \text{equation 5}$$

Note that this bound is independent of the translation x.

Now, let $H(p,n_{74},r_0,x)$ denote the vertices so constructed for a vertex p. For a convex polygon with vertex set V, the convex hull of the set of vertices given by equation 6 bounds the region swept by the polygon.

$$\bigcup_{p_i \in V} H(p_i, n_\theta, r_0, x) \qquad \text{equation 6}$$

By convexity, the distance error bound in equation 5 for the line-segment case also holds for a polygon or polyhedron that projected has diameter I perpendicular to the rotation axis. This is particularly significant because I is typically much smaller than r, and because a more careful analysis often eliminates the lsinθ term when it is not.

Using H to expand the vertex sets in the calls to Gilbert's Algorithm in the hierarchical distance algorithm results in a conservative distance approximation algorithm. An error bound can be computed from equation 5 and the I and r for the closest pair of polygons (polyhedra) found. The expanded vertex sets and the distance underestimation makes the cost greater than the simpler approximation technique, but guarantees conservative results.

IMPLEMENTATION

Figure 2:
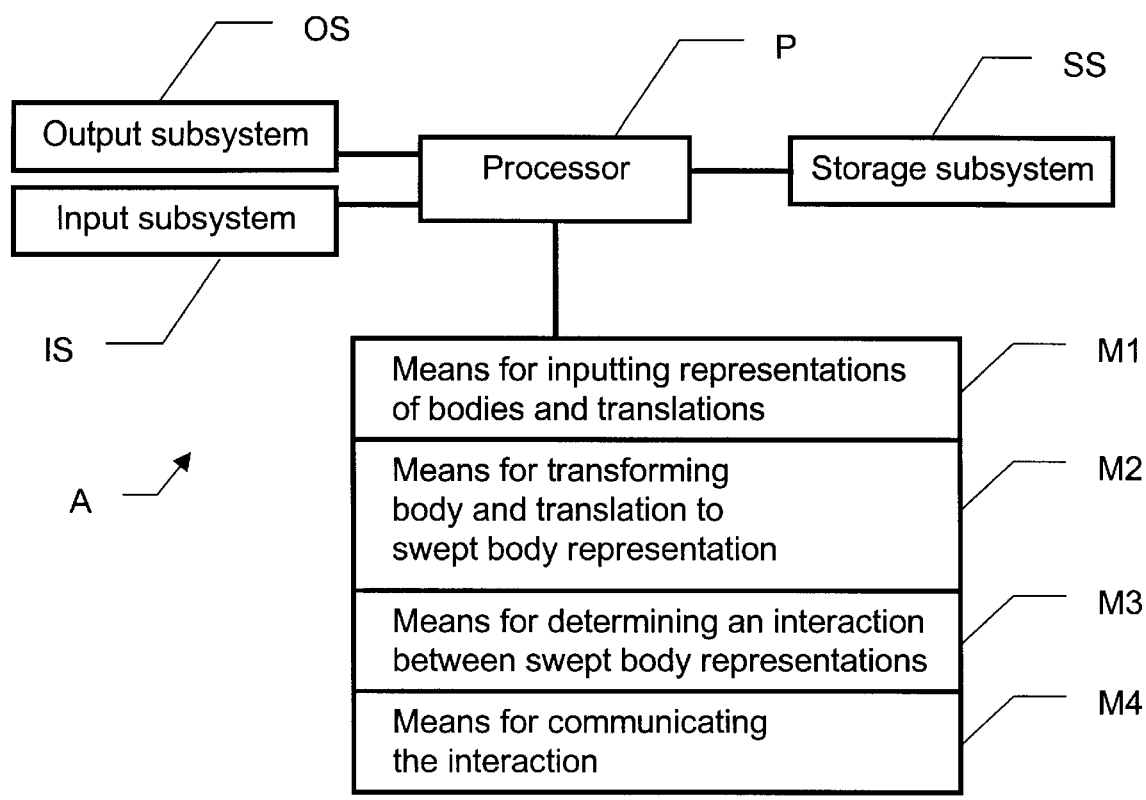
FIG. 2 is a schematic representation of an apparatus according to the present invention.

FIG. 2 shows an apparatus A according to the present invention. Processor P connects with input subsystem IS, output subsystem OS, and storage subsystem SS. Processor P can be, for example, a workstation such as those currently commercially available. Input subsystem IS can include, for example, a keyboard, a mouse, and a network connection. Output subsystem OS can include, for example, a video display, an audio speaker, a printer, and a network connection. Storage subsystem SS can include, for example, semiconductor memory, disk drives, tape storage, and network-based storage.

Apparatus A also comprises means for performing certain operations. These means can be programmed in software by techniques known to those skilled in the art. They can also be implemented in hardware, or in combination of hardware and software. Apparatus A includes means for using input subsystem IS to accept input representations of two bodies and corresponding translations M1. Apparatus A also includes means for transforming the input representations into swept body representations M2. Apparatus A also includes means for determining an interaction between the swept body representations M3. Apparatus A also includes means for using output subsystem OS for communicating the interaction M4.

Means for determining an interaction M3 can comprise means for determining closest approach or collision from volumes swept by nodes in bounding-volume hierarchical representations of two bodies. The means for determining an interaction can accordingly comprise means for determining distance between the convex hulls of two sets of vertices. The means for determining an interaction can accordingly comprise means for determining distance between the origin and from the Minkowski difference of two sets of vertices. It can also comprise means for initializing the (vertices of) a simplex of the Minkowski difference of two sets of vertices. It can also comprises means for determining whether the simplex overlaps the origin. It can also comprise means for determining whether a line segment between a simplex and a point is a minimum-length line segment. It could also comprise means for modifying the simplex.

EXAMPLE RESULTS AND PERFORMANCE

Figure 3:
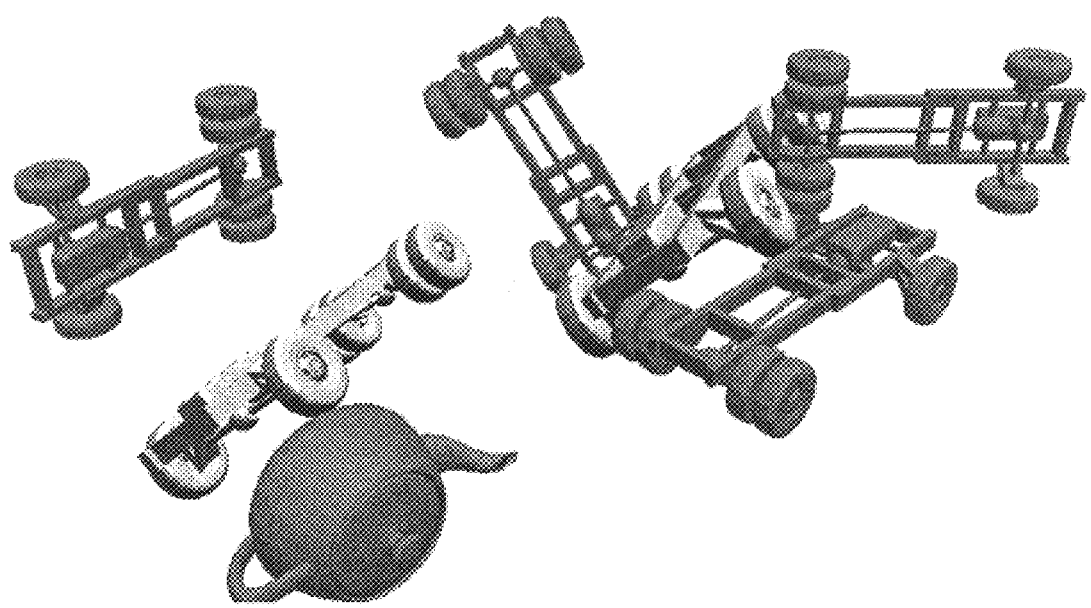
FIG. 3 is an example of interference determination according to the present invention.

Example of interference determination, implemented as distance determination subject to maximum and minimum thresholds, covered two model scenarios. In the first, shown in FIG. 3, coded "FT", a truck chassis (10K polygons) moves through an environment containing other truck chassis and a teapot (42K polygons total). The objects are up to 10 units in scale, and the translational path is 20 units long. Zero-distance occurs near both ends of the path, and the interference and distance queries are typical of gross-motion problems or free-flight.

Figure 4:
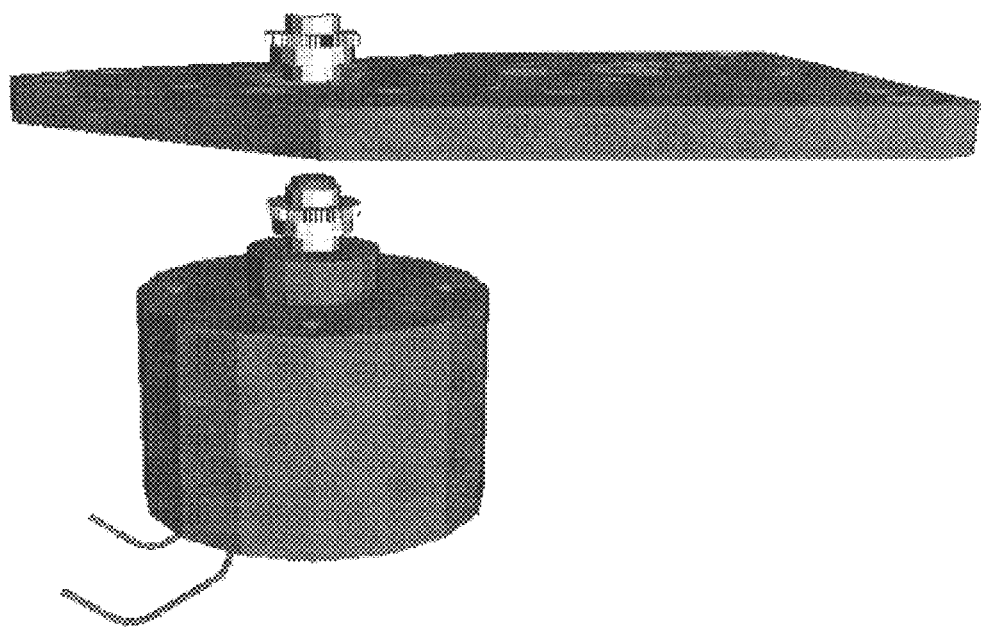
FIG. 4 is an example of interference determination according to the present invention.

In the second scenario, shown in FIG. 4, coded "GPM", a gear (3920 polygons) drops through a hole in a flat plate (4054 polygons) and onto the spindle of a motor (2252 polygons). The motor is roughly unit scale, and the translational path is one unit long. The clearance between the gear and the motor spindle is 0.00125 units. Except where noted, an initial call is always made to the distance function to initialize the caches, so that the runs reflect steady-state behavior.

The first series of experiments compared the costs of four types of queries: basic distance (D), interference detection (I), swept-body distance (DS), and swept-body interference detection (IS). For each model scenario, the motion was broken into 25–400 steps. The results are shown in Table 5. The table shows swept-body interference detection and distance computation costing up to 30–50 percent more time than their basic counterparts. Swept-body interference detection was typically half as expensive as basic distance computation.

An interesting observation is that, despite the much smaller polygon count, the GPM examples were computationally more intensive than the FT examples. Not only were clearances small in the hole and on the spindle, but in both cases, the geometric symmetry meant that there were many pairs of polygons approximately the minimal distance (0.00125) apart. This was a semi-pathological but realistic occurrence. While the gear moves onto the spindle in the last 20–25 percent of the motion, there are typically 500 pairs of polygons that are about the same, minimal distance apart, and distance calculation slowed to 10–15Hz. For comparison, setting the interference threshold to 0.00128, the implementation exploits cached information to detect interference at over 2 kHz in that segment.

TABLE 5

| scenario | num steps expt | 25 | 50 | 100 | 200 | 400 |
|---|---|---|---|---|---|---|
| FT | D | 1.60 | 1.90 | 2.20 | 2.90 | 5.30 |
| FT | I | 0.32 | 0.49 | 0.83 | 1.50 | 2.70 |
| FT | DS | 1.50 | 1.90 | 2.50 | 3.80 | 6.40 |
| FT | IS | 0.44 | 0.64 | 1.10 | 2.00 | 3.50 |
| GPM | D | 2.00 | 3.30 | 5.90 | 10.70 | 20.90 |
| GPM | I | 0.59 | 1.10 | 1.70 | 3.10 | 6.00 |
| GPM | DS | 3.10 | 5.10 | 9.30 | 17.30 | 31.90 |
| GPM | IS | 1.00 | 1.60 | 2.60 | 4.60 | 8.60 |

APPLICATIONS

Two important problems that arise in assembly planning are to determine: (i) whether a linear translation causes interference, and (ii) which pairs of polygons interfere during the motion. Basic interference detection can only answer (i) and (ii) to a resolution equal to the step size. Accuracy is attainable if both the step size and the interference threshold (safety margin) can be precisely manipulated. Basic distance algorithms have the advantage of efficient step size estimates. Finally, both (i) and (ii) can also be reduced to polygon-polygon collision detection problems by stepping through the motion and collecting all polygon pairs less than a step size apart.

In contrast, a single swept-body interference query is sufficient to answer (i) exactly. On an implementation that can automatically collect all pairs of interfering polygons (i.e., witness pairs), a single query is also sufficient for (ii). Because the translational swept-body distance method is exact, it is not necessary to step through the motion. In the GPM scenario, the implementation of the present invention required 0.45 seconds each for (i) and (ii) when there was no contact ($\epsilon=0.00124$), and 0.45 seconds for (i) and 0.89 seconds (1335 witness pairs) for (ii) when there was contact ($\epsilon=0.00126$). For this test, no cache initialization queries were done, since it is likely that this sort of query would be done "cold" in practice.

Sequential-motion collision detection queries occur in dynamical simulation and other applications. An additional problem that arises is (iii) to determine contact initiation and termination points during a timestep. Computing a conservative approximation of (ii)—finding a guaranteed superset of polygon pairs that interfere sometime during a step— reduces this problem to a collection of polygon-polygon problems.

For an example of this sub-task, two cases of the gear-plate-motor example were considered, one in which the 0.00125 unit clearance is considered interference/collision ($\epsilon=0.00128$), and one in which it is not. Five experiments were conducted. Using basic thresholded interference detection with witness collection, we set the interference threshold to half the step size (TW) and to the same value plus $\epsilon$ (TW$\epsilon$). Swept-body interference detection with witness collection was tested both with the $\epsilon$ (ISW$\epsilon$) and without (ISW). The swept-body tests used a hybrid implementation—the swept-body code was triggered when basic code would collect witnesses because of the interference threshold. This accounts for GPM/ISW being faster than GPM/IS. The swept-body interference detection with the $\epsilon$ but without witness collection (IS$\epsilon$) was also performed.

TABLE 6

| scenario | expt | num steps | | time (seconds) | | |
|---|---|---|---|---|---|---|
| | | 25 | 50 | 100 | 200 | 400 |
| GPM | TW | 3.70 | 3.60 | 5.70 | 9.80 | 7.80 |
| GPM | TW$\epsilon$ | 3.70 | 3.70 | 5.80 | 9.40 | 17.80 |
| GPM | ISW | 0.83 | 1.20 | 2.10 | 3.50 | 7.80 |
| GPM | IS$\epsilon$ | 0.44 | 0.60 | 0.84 | 1.49 | 2.85 |
| GPM | ISW$\epsilon$ | 1.90 | 3.00 | 5.10 | 8.70 | 16.80 |

Two important comparisons are evident. First, compare GPM/ISW and GPM/IS$\epsilon$ against GPM/TW and GPM/TW$\epsilon$ to consider how useful swept-body interference detection might be in answering problem (i)—determining whether a collision takes place during a motion step. The data shows the swept-body method to be much faster except when there is no interference and the step size is smaller than the clearance. To consider efficiency in collecting witnesses for accurately answering problems (ii) and (iii), compare GPM/ISW and GPM/ISW$\epsilon$ to GPM/TW and GPM/TW$\epsilon$. The basic code is several times as costly as the swept-body code when the former must collect many polygon pairs that the latter safely rules out, and that the two methods cost about the same when they find similarly high numbers of collision candidates.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. A method for using a computer to model interactions between a first body experiencing a first translation concurrent with a first rotation and a second body experiencing a second translation concurrent with a second rotation, comprising:

a) receiving into the computer representations of said first body, said first translation concurrent with said first rotation, said second body, and said second translation concurrent with said second rotation;

b) using the computer to transform the representation of said first body and the representation of said first translation concurrent with said first rotation into a first swept representation comprising a hierarchical bounding volume representation whose leaves each contain an approximate representation of the region swept by a section of said first body during said first translation concurrent with said first rotation, wherein the union of said volumes is approximately a superset of the region swept by the surface of said first body during said first translation concurrent with said first rotation;

c) using the computer to transform the representation of said second body and the representation of said second translation concurrent with said second rotation into a second swept representation comprising a hierarchical bounding volume representation whose leaves each contain an approximate representation of the region swept by a section of said second body during said second translation concurrent with said second rotation, wherein the union of said volumes is approximately a superset of the region swept by the surface of said second body during said second translation concurrent with said second rotation;

d) using the computer to determine an interaction between said first swept representation and said second swept representation; and e) communicating the interaction.

2. A method according to claim 1, wherein the interaction determined is the approximate minimum distance between said first swept representation and said second swept representation.

3. A method according to claim 2, wherein the representations of said first body and said second body comprise unions of convex polygons and convex polyhedra.

4. A method according to claim 3, a) wherein the step of using the computer to determine the approximate minimum distance comprises using the computer to determine the minimum distance between the convex hull of a first finite set of discrete points in said first swept representation and the convex hull of a second finite set of discrete points in said second representation; and b) wherein the nodes in said first swept representation are in one to one correspondence with the nodes in an hierarchical bounding volume representation of said first body; and c) wherein the nodes in said second swept representation are in one to one correspondence with the nodes in an hierarchical bounding volume representation of said second body; and d) wherein the convex hull of said first finite set of discrete points comprises the geometry of a node in said first swept representation, and the convex hull of said second finite set of discrete points is the geometry of a node in said second swept representation; and e) wherein the steps of using the computer to transform the representation of said first body and using the computer to transform the representation of said second body are selected from the group consisting of:

i) forming nodes in said first swept representation such that the geometry of each of said nodes is the convex hull of the union of the geometry of the corresponding node in a hierarchical bounding volume representation of said first body before said first translation and said first rotation together with the geometry of the corresponding node in a hierarchical bounding volume representation of said first body after said first translation and said first rotation, and forming nodes in said second swept representation such that the geometry of each of said nodes is the convex hull of the union of the geometry of the corresponding node in a hierarchical bounding volume representation of said second body before said second translation and said second rotation together with the geometry of the corresponding node in a hierarchical bounding volume representation of said second body after said second translation and said second rotation;

ii) forming nodes in said first swept representation such that the geometry of each of said nodes is selected from the group consisting of: convex polyhedron and convex polygon, and is a superset of the region swept by the corresponding node in a hierarchical bounding volume representation of said first body during said first translation and said first rotation, and forming nodes in said second swept representation such that the geometry of each of said nodes is selected from the group consisting of: convex polyhedron and convex polygon, and is a superset of the region swept by the corresponding node in a hierarchical bounding volume representation of said second body during said second translation and said second rotation; and iii) combinations thereof.

5. A method according to claim 4, wherein the step of using the computer to determine the approximate minimum distance comprises using the computer according to Gilbert's Algorithm using a first set of points in said first swept representation and a second set of points in said second representation as inputs to Gilbert's Algorithm.

6. A method according to claim 4, wherein said discrete points are represented in a coordinate system having an origin, and wherein the step of using the computer to determine the minimum distance between the convex hull of a first finite set of discrete points and the convex hull of a second finite set of discrete points comprises:

a) initializing the vertices of a simplex using points from the Minkowski difference set of said first set of points and said second set of points;

b) determining whether said simplex overlaps said origin;

c) determining whether a line-segment between said simplex and said origin has its non-origin vertex on the convex hull of said Minkowski difference set and is a minimum-length line-segment from said hull to the origin, and if so, determining the minimum distance to be the length of said line segment;

d) otherwise, modifying said simplex using vertices from said Minkowski difference set and repeating step (b) through (d).

7. A method according to claim 4, wherein said discrete points are represented in a coordinate system having an origin, and wherein the step of using the computer to determine the minimum distance between the convex hull of a first finite set of discrete points and the convex hull of a second finite set of discrete points comprises:

a) initializing the vertices of a first simplex from the Minkowski difference set of said first set of points and said second set of points;

b) determining a current distance vector as a minimum-length vector from said first simplex to said origin;

c) if the length of said current distance vector is less than a minimum length, then determining said minimum distance to be zero;

d) otherwise, determining an error measure from said current distance vector, said first set of points, and said second set of points, and if said error measure is sufficiently small then determining said minimum distance to be the length of said current distance vector;

e) otherwise, if possible, forming a modified simplex from said first simplex by removing all vertices from said first simplex that do not lie on the plane perpendicular to the current distance vector and passing through a point on said first simplex closest to said origin, and by adding a closer vertex from the Minkowski difference set, wherein a closer vertex is a vertex further in the direction of said current distance vector, and repeating steps (b) through (e) using said modified simplex in place of said first simplex;

f) otherwise, determining said minimum distance to be the length of the current distance vector.

8. A method according to claim 1 wherein the interaction determined is approximate collision between the region swept by the first body during the first translation concurrent with the first rotation and the second body during the second translation concurrent with the second rotation.

9. A method according to claim 8, wherein the first and second bodies are represented by unions of convex polygons and convex polyhedra.

10. A method according to claim 9, a) wherein the step of using the computer to determine approximate collision comprises using the computer to determine collision between the convex hull of a first finite set of discrete points in said first swept representation and the convex hull of a second finite set of discrete points in said second representation; and b) wherein the nodes in said first swept representation are in one to one correspondence with the nodes in an hierarchical bounding volume representation of said first body; and c) wherein the nodes in said second swept representation are in one to one correspondence with the nodes in an hierarchical bounding volume representation of said second body, and said second swept representation; and d) wherein the convex hull of said first finite set of discrete points comprises the geometry of a node in said first swept representation, and the convex hull of said second finite set of discrete points is the geometry of a node in said second swept representation; and e) wherein the steps of using the computer to transform the representation of said first body and using the computer to transform the representation of said second body are selected from the group consisting of:

i) forming nodes in said first swept representation such that the geometry of each of said nodes is the convex hull of the union of the geometry of the corresponding node in a hierarchical bounding volume representation of said first body before said first translation and said first rotation together with the geometry of the corresponding node in a hierarchical bounding volume representation of said first body after said first translation and said first rotation, and forming nodes in said second swept representation such that the geometry of each of said nodes is the convex hull of the union of the geometry of the corresponding node in a hierarchical bounding volume representation of said second body before said second translation and said second rotation together with the geometry of the corresponding node in a hierarchical bounding volume representation of said second body after said second translation and said second rotation;

ii) forming nodes in said first swept representation such that the geometry of each of said nodes is selected from the group consisting of: convex polyhedron and convex polygon, and is a superset of the region swept by the corresponding node in a hierarchical bounding volume representation of said first body during said first translation and said first rotation, and forming nodes in said second swept representation such that the geometry of each of said nodes is selected from the group consisting of: convex polyhedron and convex polygon, and is a superset of the region swept by the corresponding node in a hierarchical bounding volume representation of said second body during said second translation and said second rotation; and iii) combinations thereof.

11. A method according to claim 10 wherein the step of using the computer to determine approximate collision comprises using the computer according to Gilbert's Algorithm using a first set of points in said first swept representation and a second set of points in said second representation as inputs to Gilbert's Algorithm.

12. A method according to claim 10, wherein said discrete points are represented in a coordinate system having an origin, and wherein the step of using the computer to determine collision between the convex hull of a first finite set of discrete points and the convex hull of a second finite set of discrete points comprises:

a) initializing the vertices of a simplex using points from the Minkowski difference set of said first set of points and said second set of points;

b) determining whether said simplex overlaps said origin, and if so, determining that collision occurs;

c) determining whether a line-segment between said simplex and said origin has its non-origin vertex on the convex hull of said Minkowski difference set and is a minimum-length line-segment from said convex hull to said origin, and if so, determining whether the length of said line segment is less than a minimum length, and if so, determining that collision occurs;

d) otherwise, modifying said simplex using vertices from said Minkowski difference set and repeating step (b) through (d);

e) otherwise, determining that no collision occurs.

13. A method according to claim 10, wherein said discrete points are represented in a coordinate system having an origin, and wherein the step of using the computer to determine collision between the convex hull of a first finite set of discrete points and the convex hull of a second finite set of discrete points comprises:

a) initializing the vertices of a first simplex from the Minkowski difference set of said first set of points and said second set of points;

b) determining a current distance vector as a minimum-length vector from said first simplex to said origin;

c) if the length of said current distance vector is less than a minimum length, then determining that collision occurs;

d) otherwise, determining an error measure from said current distance vector, said first set of points, and said second set of points, and if said error measure is sufficiently small then if the length of said current distance vector is less than a minimum length the determining that collision occurs, and if the length of said current distance vector is not less than a minimum length then determining that collision does not occur;

e) otherwise, if possible, forming a modified simplex from said first simplex by removing all vertices from said first simplex that do not lie on the plane perpendicular to the current distance vector and passing through a point on said first simplex closest to the origin, and by adding a closer vertex from the Minkowski difference set, wherein a closer vertex is a vertex further in the direction of said current distance vector, and repeating steps (b) through (d) using said modified simplex in place of said first simplex;

f) otherwise, determining that no collision occurs.

14. An apparatus for modeling interactions between a first body experiencing a first translation concurrent with rotation and a second body experiencing a second translation concurrent with rotation, comprising:

a) a processor;
b) a storage subsystem;
c) an input subsystem;
d) an output subsystem;
e) means for using said input subsystem to receive into said storage subsystem representations of said first body, said first translation concurrent with rotation, said second body, and said second translation concurrent with rotation;
f) means for transforming said representation of said first body and said representation of said first translation concurrent with rotation into a first swept representation comprising a hierarchical bounding volume representation whose leaves each contain a representation of the region swept by a section of said first body during said first translation concurrent with rotation, wherein the union of said volumes is a superset of the region swept by the surface of said first body during said first translation concurrent with rotation;
g) means for transforming the representation of said second body and said representation of said second translation concurrent with rotation into a second swept representation comprising a hierarchical bounding volume representation whose leaves each contain a representation of the region swept by a section of said second body during said second translation concurrent with rotation, wherein the union of said volumes is a superset of the region swept by the surface of said second body during said second translation concurrent with rotation;
h) means for determining an interaction between said first swept representation and said second swept representation; and
i) means for using said output subsystem to communicate said interaction.

15. The apparatus of claim 14, wherein the means for determining an interaction comprise means for determining the approximate minimum distance between said first swept representation and said second swept representation.

16. The apparatus of claim 15, wherein the means for determining the approximate minimum distance comprises means for determining the minimum distance between the convex hull of a first finite set of discrete points in said first swept representation and the convex hull of a second finite set of discrete points in said second representation, a) wherein the means for determining the approximate minimum distance comprises means for determining the minimum distance between the convex hull of a first finite set of discrete points in said first swept representation and the convex hull of a second finite set of discrete points in said second representation; and
b) wherein the nodes in said first swept representation are in one to one correspondence with the nodes in an hierarchical bounding volume representation of said first body; and
c) wherein the nodes in said second swept representation are in one to one correspondence with the nodes in an hierarchical bounding volume representation of said second body, and said second swept representation; and
d) wherein the convex hull of said first finite set of discrete points comprises the geometry of a node in said first swept representation, and the convex hull of said second finite set of discrete points is the geometry of a node in said second swept representation; and
e) wherein the means for transforming the representation of said first body and the means for transforming the representation of said second body are selected from the group consisting of:

i) means for forming nodes in said first swept representation such that the geometry of each of said nodes is the convex hull of the union of the geometry of the corresponding node in a hierarchical bounding volume representation of said first body before said first translation and said first rotation together with the geometry of the corresponding node in a hierarchical bounding volume representation of said first body after said first translation and said first rotation, and means for forming nodes in said second swept representation such that the geometry of each of said nodes is the convex hull of the union of the geometry of the corresponding node in a hierarchical bounding volume representation of said second body before said second translation and said second rotation together with the geometry of the corresponding node in a hierarchical bounding volume representation of said second body after said second translation and said second rotation;

ii) means for forming nodes in said first swept representation such that the geometry of each of said nodes is selected from the group consisting of: convex polyhedron and convex polygon, and is a superset of the region swept by the corresponding node in a hierarchical bounding volume representation of said first body during said first translation and said first rotation, and means for forming nodes in said second swept representation such that the geometry of each of said nodes is selected from the group consisting of: convex polyhedron and convex polygon, and is a superset of the region swept by the corresponding node in a hierarchical bounding volume representation of said second body during said second translation and said second rotation; and iii) combinations thereof.

17. The apparatus of claim 16, wherein said discrete points are represented in a coordinate system having an origin, and wherein the means for determining the minimum distance between the convex hull of a first finite set of discrete points and the convex hull of a second finite set of discrete points comprises:

a) means for initializing the vertices of a simplex using points from the Minkowski difference set of said first set of points and said second set of points;

b) means for determining whether said simplex overlaps said origin;

c) means for determining whether a line-segment between said simplex and said origin has its non-origin vertex on the convex hull of said Minkowski difference set and is a minimum-length line-segment from said convex hull to said origin, and if so, determining the minimum length to be the length of said line segment;

d) means for modifying said simplex using vertices from said Minkowski difference set and repeating step (b) through (d).

18. The apparatus of claim 16, wherein said discrete points are represented in a coordinate system having an origin, and wherein the means for determining the minimum distance between the convex hull of a first finite set of discrete points and the convex hull of a second finite set of discrete points comprises:

a) means for initializing the vertices of a first simplex from the Minkowski difference set of said first set of points and said second set of points;

b) means for determining a current distance vector as a minimum-length vector from said first simplex to said origin;

c) means for determining whether the length of said current distance vector is less than a minimum length, and if so, then determining said minimum distance to be zero;

d) means for determining an error measure from said current distance vector, said first set of points, and said second set of points, and if said error measure is sufficiently small then determining said minimum distance to be the length of said current distance vector;

e) means for, if possible, forming a modified simplex from said first simplex by removing all vertices from said first simplex that do not lie on the plane perpendicular to the current distance vector and passing through a point on said first simplex closest to said origin, and by adding a closer vertex from the Minkowski difference set, wherein a closer vertex is a vertex further in the direction of said current distance vector, and repeating steps (b) through (e) using said modified simplex in place of said first simplex;

f) means for determining said minimum distance to be the length of the current distance vector if it is not possible to form a modified simplex according to (e).

19. The apparatus of claim 14, wherein the means for determining an interaction comprise means for determining approximate collision between said first swept representation and said second swept representation.

20. The apparatus of claim 19, a) wherein the means for determining approximate collision comprises means for determining approximate collision between the convex hull of a first finite set of discrete points in said first swept representation and the convex hull of a second finite set of discrete points in said second representation, b) wherein the nodes in said first swept representation are in one to one correspondence with the nodes in an hierarchical bounding volume representation of said first body; and c) wherein the nodes in said second swept representation are in one to one correspondence with the nodes in an hierarchical bounding volume representation of said second body, and said second swept representation; and d) wherein the convex hull of said first finite set of discrete points comprises the geometry of a node in said first swept representation, and the convex hull of said second finite set of discrete points is the geometry of a node in said second swept representation; and e) wherein the means for transforming the representation of said first body and the means for transforming the representation of said second body are selected from the group consisting of:

i) means for forming nodes in said first swept representation such that the geometry of each of said nodes is the convex hull of the union of the geometry of the corresponding node in a hierarchical bounding volume representation of said first body before said first translation and said first rotation together with the geometry of the corresponding node in a hierarchical bounding volume representation of said first body after said first translation and said first rotation, and means for forming nodes in said second swept representation such that the geometry of each of said nodes is the convex hull of the union of the geometry of the corresponding node in a hierarchical bounding volume representation of said second body before said second translation and said second rotation together with the geometry of the corresponding node in a hierarchical bounding volume representation of said second body after said second translation and said second rotation;

ii) means for forming nodes in said first swept representation such that the geometry of each of said nodes is selected from the group consisting of: convex polyhedron and convex polygon, and is a superset of the region swept by the corresponding node in a hierarchical bounding volume representation of said first body during said first translation and said first rotation, and means for forming nodes in said second swept representation such that the geometry of each of said nodes is selected from the group consisting of: convex polyhedron and convex polygon, and is a superset of the region swept by the corresponding node in a hierarchical bounding volume representation of said second body during said second translation and said second rotation; and iii) combinations thereof.

21. The apparatus of claim 20, wherein said discrete points are represented in a coordinate system having an origin, and wherein the means for determining approximate collision between the convex hull of a first finite set of discrete points and the convex hull of a second finite set of discrete points comprises:

a) means for initializing the vertices of a simplex using points from the Minkowski difference set of said first set of points and said second set of points;

b) means for determining whether said simplex overlaps said origin, and if so, determining that approximate collision occurs;

c) means for determining whether a line-segment between said simplex and said origin has its non-origin vertex on the convex hull of said Minkowski difference set and is a minimum-length line-segment from said convex hull to said origin, and if so, determining whether the length of said line segment is less than a minimum length, and if so, determining that approximate collision occurs;

d) means for, if possible, modifying said simplex using vertices from said Minkowski difference set and repeating step (b) through (d);

e) means for determining that no approximate collision occurs if it is not possible to modify said simplex according to (d).

22. The apparatus of claim 20, wherein said discrete points are represented in a coordinate system having an origin, and wherein the means for determining approximate collision between the convex hull of a first finite set of discrete points and the convex hull of a second finite set of discrete points comprises:

a) means for initializing the vertices of a first simplex from the Minkowski difference set of said first set of points and said second set of points;

b) means for determining a current distance vector as a minimum-length vector from said simplex to said origin;

c) means for determining that approximate collision occurs if the length of said current distance vector is less than a minimum length;

d) means for determining an error measure from said current distance vector, said first set of points, and said second set of points, and if said error measure is sufficiently small then if the length of said current distance vector is less than a minimum length the determining that approximate collision occurs, and if the length of said current distance vector is not less than a minimum length then determining that approximate collision does not occur;

e) means for if possible, forming a modified simplex from said first simplex by removing all vertices from said first simplex that do not lie on the plane perpendicular to the current distance vector and passing through a point on said first simplex closest to said origin, and by adding a closer vertex from the Minkowski difference set, wherein a closer vertex is a vertex further in the direction of said current distance vector, and repeating steps (b) through (d) using said modified simplex in place of said first simplex;

f) means for determining said minimum distance to be the length of the current distance vector if it is not possible to form a modified simplex according to (e).

* * * * *